United States Patent
Natu et al.

(10) Patent No.: US 10,628,801 B2
(45) Date of Patent: Apr. 21, 2020

(54) SYSTEM AND METHOD FOR SMART ALERTS

(71) Applicant: Tata Consultancy Services Limited, Mumbai (IN)

(72) Inventors: Maitreya Natu, Pune (IN); Praveen Venkateswaran, Pune (IN); Vaishali Paithankar Sadaphal, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 819 days.

(21) Appl. No.: 15/230,120

(22) Filed: Aug. 5, 2016

(65) Prior Publication Data

US 2017/0039530 A1    Feb. 9, 2017

(30) Foreign Application Priority Data

Aug. 7, 2015    (IN) .......................... 2986/MUM/2015

(51) Int. Cl.
| | | |
|---|---|---|
| *G06Q 10/10* | (2012.01) | |
| *G06F 11/07* | (2006.01) | |
| *G06F 11/00* | (2006.01) | |
| *G06Q 10/06* | (2012.01) | |
| *G06F 11/34* | (2006.01) | |

(52) U.S. Cl.
CPC ....... *G06Q 10/1097* (2013.01); *G06F 11/008* (2013.01); *G06F 11/0709* (2013.01); *G06F 11/079* (2013.01); *G06F 11/0715* (2013.01); *G06F 11/0757* (2013.01); *G06F 11/0793* (2013.01); *G06Q 10/06316* (2013.01); *G06F 11/3452* (2013.01)

(58) Field of Classification Search
CPC .......... G06Q 10/1097; G06Q 10/06316; G06F 11/008; G06F 11/0709; G06F 11/0715; G06F 11/0757; G06F 11/079; G06F 11/0793; G06F 11/34525; G06F 9/4881
See application file for complete search history.

(56) References Cited

U.S. PATENT DOCUMENTS

| | | | |
|---|---|---|---|
| 7,225,103 B2 * | 5/2007 | Beresniewicz .... | G05B 23/0235 700/26 |
| 8,495,661 B2 | 7/2013 | Carey et al. | |
| 2006/0224254 A1 * | 10/2006 | Rumi ................. | G05B 13/0275 700/28 |

(Continued)

OTHER PUBLICATIONS

Veasey, T.J. et al. (Apr. 2014). "Anomaly Detection in Application Performance Monitoring Data," *International Journal of Machine Learning and Computing*, vol. 4, No. 2, pp. 120-127.

*Primary Examiner* — Matthew S Gart
*Assistant Examiner* — Stephen S Swartz
(74) *Attorney, Agent, or Firm* — Finnegan, Henderson, Farabow, Garrett & Dunner LLP

(57) ABSTRACT

A system for smart alerts in a batch system for an IT enterprise. The method includes alert configuration by identifying recent steady state of a batch job and deriving schedules for the steady state. The normal behaviour is then computed within the schedules. The method further includes aggregating the one or more alerts by identifying correlated group of alerts by pruning of one or more jobs and alerts, detecting correlations between the two or more alerts and deriving causality of the grouped alerts. The method finally includes predicting of future alerts of a batch job.

10 Claims, 3 Drawing Sheets

(56) References Cited

U.S. PATENT DOCUMENTS

| | | | |
|---|---|---|---|
| 2007/0136115 A1* | 6/2007 | Senturk Doganaksoy | G06F 17/18 705/35 |
| 2009/0138415 A1* | 5/2009 | Lancaster | G06N 5/04 706/11 |
| 2009/0210878 A1* | 8/2009 | Huang | G06F 9/4881 718/102 |
| 2012/0110582 A1* | 5/2012 | Ferdous | G06F 11/3442 718/101 |
| 2013/0297767 A1* | 11/2013 | Kozine | G06F 11/3447 709/224 |
| 2014/0079297 A1* | 3/2014 | Tadayon | G06K 9/00 382/118 |
| 2014/0101307 A1 | 4/2014 | Carey et al. | |
| 2014/0201126 A1* | 7/2014 | Zadeh | G06N 7/005 706/52 |
| 2014/0316877 A1* | 10/2014 | Snyder | G06Q 30/0235 705/14.35 |
| 2014/0372438 A1* | 12/2014 | Chandramouli | G06F 16/285 707/737 |
| 2015/0207696 A1 | 7/2015 | Zhang et al. | |
| 2015/0242264 A1* | 8/2015 | Vibhor | G06Q 10/06 714/57 |
| 2015/0379430 A1* | 12/2015 | Dirac | G06N 20/00 706/12 |

\* cited by examiner

SYSTEM AND METHOD FOR SMART ALERTS

CROSS REFERENCE TO RELATED APPLICATIONS AND PRIORITY

This U.S. patent application claims priority under 35 U.S.C. § 119 to India Application No. 2986/MUM/2015, filed on Aug. 7, 2015. The entire contents of the aforementioned application are incorporated herein by reference.

TECHNICAL FIELD

The present subject matter relates, in general, to smart alerts, and, more particularly, to a method and system for smart alerts in a batch system for an IT enterprise.

BACKGROUND

With the increasing reliance of today's business on IT, enterprise IT systems need to maintain high levels of availability and performance. To achieve this, the health of IT systems is continuously monitored. Abnormal behaviors of components such as failures, anomalies, SLA violations, and outages are detected and alerts are generated. These alerts are then analyzed by a team of service desk personnel or resolvers and appropriate actions are taken to resolve the issue.

Present approach of generating and analyzing alerts is highly manual, ad-hoc, and intuition-driven. Further they are reactive. The alerts are configured by observing a single component in isolation and lack a system-wide view. These are often incorrect leading to either too many false alerts or missing many legitimate problems. Furthermore, the enterprise IT systems keep evolving due to changes in business and infrastructure. The manual alert configurations fail to adapt to these changes, thereby leading to stale and often obsolete configurations.

Also, managing batch systems is challenging because of the inherent scale and complexity. A typical batch system consists of several business processes, batch jobs, connected through complex interdependencies. Furthermore, outages and delays in batch jobs can lead to heavy financial losses. Hence, it is imperative to correctly monitor batch systems and ensure that all potential anomalies are timely captured and notified. Herein, batch jobs and jobs have be used interchangebly throughout the description. In an example scenario, a batch system is configured to generate a variety of alerts. Some of the most common alerts are abnormally high job run times (MAXRUNALARM), abnormally low job run times (MINRUNALARM), delayed start of a job, delayed end of a job, job failures, and the like. The large scale and complexity of batch systems results in an increase in noise and redundant alerts. This makes the problem of generating the right alerts at the right time very relevant in today's batch systems.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, various embodiments herein provide methods and systems for smart alerts in a batch system. In an aspect, a computer implemented method for configuring of one or more alerts, by identifying a recent steady state of a batch job, and deriving at least one schedule within the recent steady state of the batch job and computing a normal behavior within the at least one schedule. The method further comprises aggregating of alerts by identifying correlated group of alerts. The correlation of group of alerts includes pruning of one or more jobs and alerts, detecting the by using one or more correlation rules for grouping the alerts and deriving causality of the grouped alerts using one or more causality rules to identify potential causes and effects. Finally, the method for predicting of future alerts of a batch job based on at least one or more of univariate metric forecasting, multivariate metric forecasting, and system behavior.

In another aspect, computer-implemented system for smart alerts is provided. The system includes a memory, and a processor. The memory is coupled to the processor, such that the processor is configured by the said instructions stored in the memory to configure of one or more alerts, by identifying a recent steady state of a batch job, and deriving at least one schedule within the recent steady state of the batch job and computing a normal behavior within the at least one schedule. Further, the system is caused to enable, aggregating of alerts by identifying correlated group of alerts. The correlation of group of alerts includes pruning of one or more jobs and alerts, detecting the by using one or more correlation rules for grouping the alerts and deriving causality of the grouped alerts using one or more causality rules to identify potential causes and effects. Finally, the system is caused to enable, the method for predicting of future alerts of a batch job based on at least one or more of univariate metric forecasting, multivariate metric forecasting, and system behavior.

In yet another aspect, a non-transitory computer-readable medium having embodied thereon a computer program for executing a method for smart alerts is provided. The method includes facilitating, configuring of one or more alerts, by identifying a recent steady state of a batch job, and deriving at least one schedule within the recent steady state of the batch job and computing a normal behavior within the at least one schedule. Further, the method includes, aggregating of alerts by identifying correlated group of alerts. The correlation of group of alerts includes pruning of one or more jobs and alerts, detecting the by using one or more correlation rules for grouping the alerts and deriving causality of the grouped alerts using one or more causality rules to identify potential causes and effects. Finally, the method includes predicting of future alerts of a batch job based on at least one or more of univariate metric forecasting, multivariate metric forecasting, and system behavior.

BRIEF DESCRIPTION OF THE DRAWINGS

The embodiments herein will be better understood from the following detailed description with reference to the drawings, in which.

DETAILED DESCRIPTION

Figure 1:
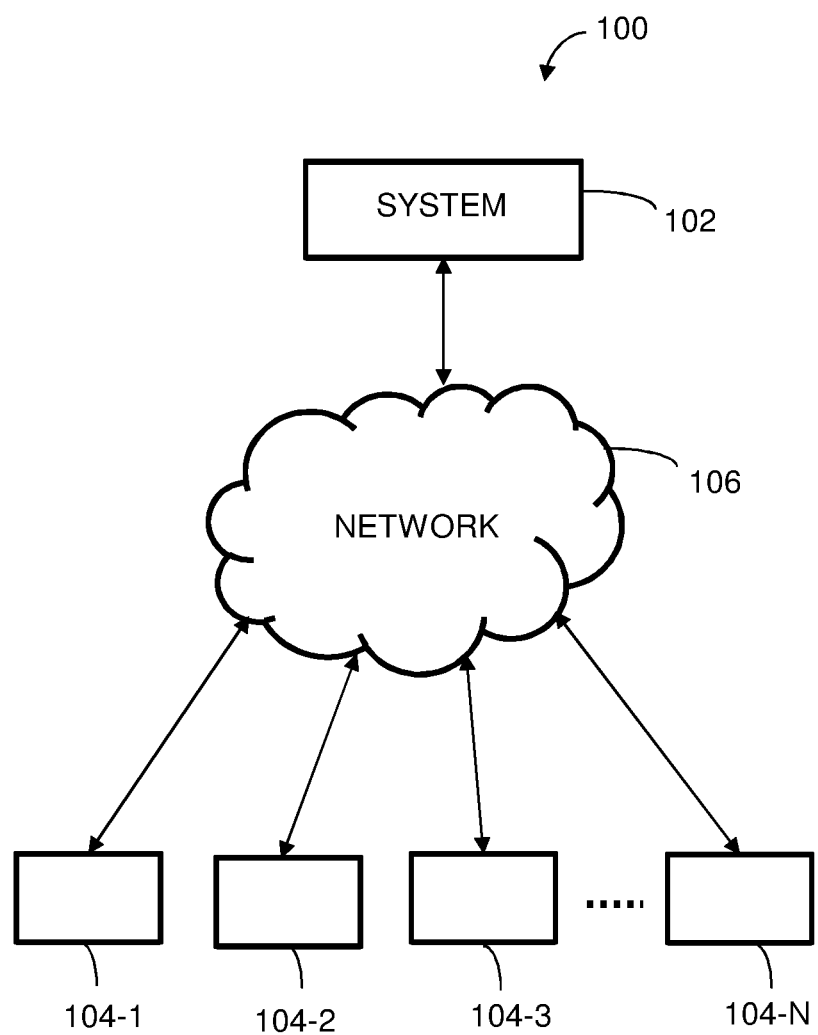
FIG. 1 illustrates a network implementation for smart alerts, in accordance with an example embodiment.

Unless specifically stated otherwise as apparent from the following discussions, it is to be appreciated that throughout the present disclosure, discussions utilizing terms such as "determining" or "generating" or "comparing" or the like, refer to the action and processes of a computer system, or similar electronic activity detection device, that manipulates and transforms data represented as physical (electronic) quantities within the computer system's registers and memories into other data similarly represented as physical quantities within the computer system memories or registers or other such information storage, transmission or display devices.

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The methods and systems are not limited to the specific embodiments described herein. In addition, the method and system can be practiced independently and separately from other modules and methods described herein. Each device element/module and method can be used in combination with other elements/modules and other methods.

Throughout the description and claims of this complete specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes and programs can be stored in a memory and executed by a processing unit.

In another firmware and/or software implementation, the functions may be stored as one or more instructions or code on a non-transitory computer-readable medium. Examples include computer-readable media encoded with a data structure and computer-readable media encoded with a computer program. The computer-readable media may take the form of an article of manufacturer. The computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk, and Blue-ray disc where disks usually reproduce data magnetically, while discs reproduce data optically with lasers. Combinations of the above should also be included within the scope of computer-readable media.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Figure 2:
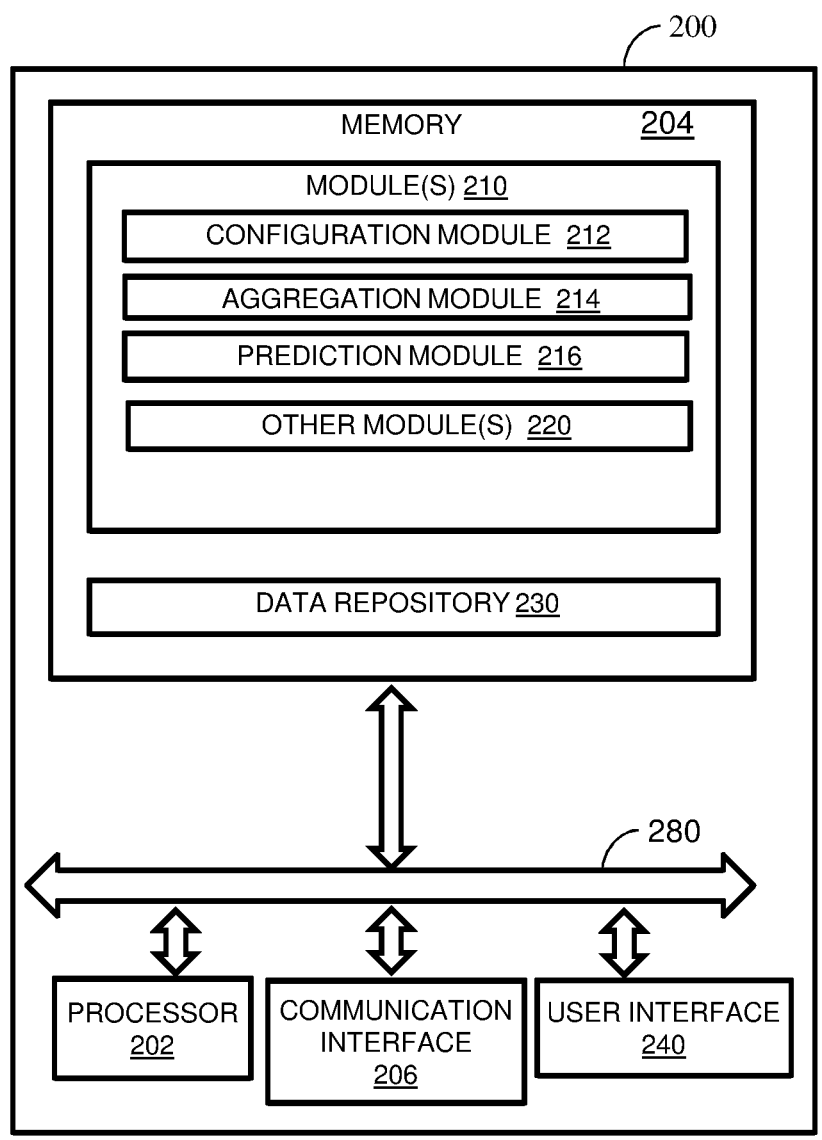
FIG. 2 illustrates a block diagram for smart alerts, in accordance with an embodiment.
Figure 3:
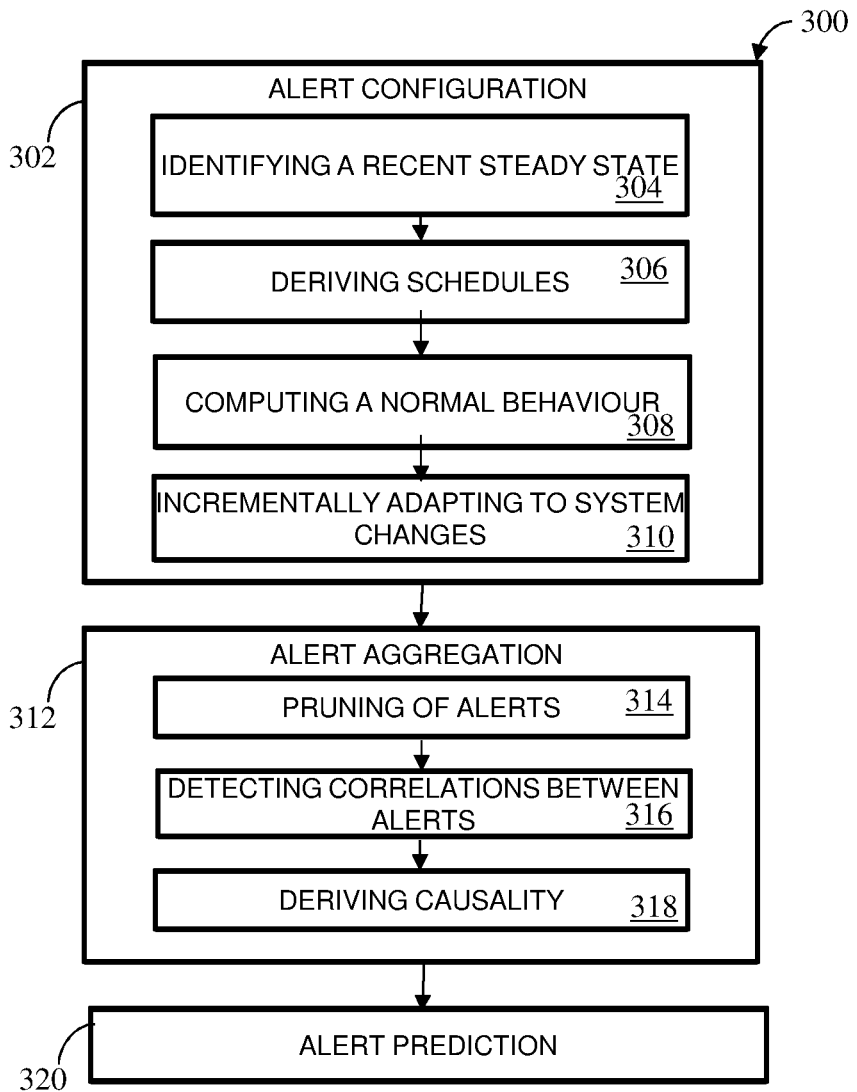
FIG. 3 illustrates a process flow of method for smart alerts, in accordance with an embodiment.

The embodiments herein provide a system and method for smart alerts. The disclosed system and method to analyze smart alerts comprises of recommending better alert configuration thresholds and configuring predictive alerts in the context of a batch systems. The disclosed method and system are not limited to the cited example scenarios and can be included in a variety of applications and scenarios without departing from the scope of the embodiments. Referring now to the drawings, and more particularly to FIGS. 1 through 3, where similar reference characters denote corresponding features consistently throughout the figures, there are shown preferred embodiments and these embodiments are described in the context of the following exemplary system and/or method.

Herein, a solution to smart alerts management system, more particularly for batch systems is provided. A batch system consists of a set of jobs where a job represents a batch application performing a specific business function. Jobs have precedence relationships that determine the order of job invocations. For example, a precedence relation indicates that in cases where a job has more than one predecessor, it can be initiated only after all its predecessor jobs complete. The batch systems may include a set of constraints on: (1) the earliest time when a batch can start, and (2) the latest time by which all the business critical jobs within a batch must complete. Various embodiments disclosed herein provide system and method for smart alerts. A network implementation for smart alerts is described further with reference to FIG. 1.

FIG. 1 illustrates a network implementation 100 for smart alerts, in accordance with an embodiment of the present subject matter. The network implementation 100 is shown to include a system 102 which can be implemented in one or more computing devices, such as devices 104-1, 104-2 . . . 104-N, and a communication network 106 for facilitating communication between the system 102 and devices 104-1, 104-2 . . . 104-N. In an embodiment, the devices 104-1, 104-2 . . . 104-N may include data sources. For example, the data sources may include but is not limited to a relational database, object mapping database, xml data, document databases, NoSQL databases, Big Data supported columnar database such as HBase, or any data structure that supports Big Data. The data sources contain information regarding the history of alerts the form of records. The batch jobs generate alerts on detecting an abnormal behavior in a system. The alerts generated by the batch jobs are configured, aggregated and future alerts are predicted by the system. Herein, it will be understood that the system 102 may also be implemented as a variety of computing systems such as a laptop computer, a desktop computer, a notebook, a workstation, a mainframe computer, a server, a network server, and the like. In one implementation, the system 102 may be implemented in a cloud-based environment. Examples of the system 102 may include, but are not limited to, a portable computer, a personal digital assistant, a handheld device, and a workstation mobile headset, and the like.

In one implementation, the communication network 106 may be a wireless network, a wired network or a combination thereof. The communication network 106 can be implemented as one of the different types of networks, such as intranet, local area network (LAN), wide area network (WAN), the internet, and the like. The communication network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

The disclosed system 102 provides smart alerts to generate predictive and preventive alerts. In a batch job an alert is generated when there is an anomaly in normal behavior of the batch job. The anomaly in the normal behavior (or abnormal behavior) can be caused due to the following reasons, but not limited to, component failures, SLA violations, outages and the like. The system 102 provides alert configuration of one or more alerts, aggregating the alerts and predicting future alerts. An example implementation of the system 102 is described further in detail with reference to FIG. 2.

FIG. 2 illustrates a block diagram for smart alerts, in accordance with an embodiment. In an embodiment, the system 200 may be embodied or executed in a computing device, for instance the computing device/system 102 (FIG. 1). The system 200 includes or is otherwise in communication with at least one processor such as a processor 202, at least one memory such as a memory 204, a communication interface 206 and a user interface 240. The processor 202, memory 204, the communication interface 206 and the user interface 240 may be coupled by a system bus such as a system bus 280 or a similar mechanism. Various components of the system 200, along with functionalities thereof are explained below.

In an embodiment, the processor 202 may include circuitry implementing, among others, audio and logic functions associated with the communication. For example, the processor 202 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processor 202 may include, among other things, a clock, an arithmetic logic unit (ALU) and logic gates configured to support operation of the processor 202. Further, the processor 202 may include functionality to execute one or more software programs, which may be stored in the memory 204 or otherwise accessible to the processor 202.

The at least one memory such as a memory 204, may store any number of pieces of information, and data, used by the system 200 to implement the functions of the system 200. The memory 204 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the processor 202 to carry out various functions in accordance with various example embodiments. The memory 204 may be configured to store instructions which when executed by the processor 202 causes the system 200 to behave in a manner as described in various embodiments.

The memory 204 also includes module(s) 210 and a data repository 230. The module(s) 210 include, for example, a configuration module 212, an aggregation module 214, a prediction module 216 and other module(s) 220. The other modules 220 may include programs or coded instructions that supplement applications or functions performed by the smart alert system 200. The data repository 230 may include historical data and/or real-time data with respect to alerts generated by batch jobs. Further, the other data 236 amongst other things, may serve as a repository for storing data that is processed, received, or generated as a result of the execution of one or more modules in the module(s) 210.

Although the data repository 230 is shown internal to the smart alert system 200, it will be noted that, in alternate embodiments, the data repository 230 can also be implemented external to the memory 204, where the data repository 230 may be stored within a database communicatively coupled to the system 200. The data contained within such external database may be periodically updated. For example, new data may be added into the database and/or existing data may be modified and/or non-useful data may be deleted from the database. In one example, the historical data with respect to alerts is stored. In another embodiment, the data stored in the data repository 230 may be real-time data with respect to alerts generated by batch jobs.

The communication interface 206 is configured to facilitate communication between the network 106 and the system 200. The communication interface 206 may be in form of a wireless connection or a wired connection. Examples of wireless communication interface 206 may include, but are not limited to, IEEE 802.11 (Wifi), BLUETOOTH®, or a wide-area wireless connection. Example of wired communication interface 206 includes, but is not limited to Ethernet.

In an example embodiment, a user interface 240 may be in communication with the processor 202. Examples of the user interface 240 include but are not limited to, input interface and/or output user interface. The input interface is configured to receive an indication of a user input. The output user interface provides an audible, visual, mechanical or other alert and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like to indicate an alert. In an example embodiment, the user interface 240 may include, among other devices or elements, any or all of a speaker, a microphone, a display, and a keyboard, touch screen, or the like.

In an embodiment, said instructions may be in the form of a program or software. The software may be in the form of system software or application software. The system for smart alerts, may be facilitated through a computer implemented application available over a network such as the Internet. In an embodiment, for performing the functionalities associated with smart alert system (described with reference to FIGS. 1 to 3), the memory 204 and the system 200 may include multiple modules or software programs that may be executed by the processor 202.

In an example embodiment, a user may be caused to access the smart alerts system (for example, system 200) using an internet gateway. In an embodiment, the processor 202 is configured to, with the content of the memory 204, and optionally with other components described herein, to cause the system 200 to enable smart alerts in batch jobs. Upon triggering of one or more abnormal behaviour in the batch jobs, the system 200 is caused to initiate alert configuration for one or more alerts generated. In an embodiment, the configuration module 212 initiates the alert configuration for smart alerts. The alert configuration process includes identifying a recent steady state of the batch job, deriving at least one schedule within the recent steady state to compute normal behaviors, deriving thresholds for each behavior and incrementally updating new steady state to adapt to changes. The method of computing normal behavior is further explained in FIG. 3. The configuration is followed by an alert aggregation process carried out by the aggregation module 214. The aggregation process includes identifying correlated group of alerts occurring together, pruning of one or more jobs and alerts is based on one or more metrics conditions, detecting correlations between two or more alerts by using one or more correlation rules for grouping the alerts, and deriving causality of the grouped alerts using one or more causality rules to identify potential causes and effects for the next steps to be carried out by the processor 202. The method of pruning alerts and the method of detecting co-relations is further explained in FIG. 3. The prediction module 216 is executed by the processor 202 for predicting of future alerts of a batch job. For example, predicting of future alerts is either based on at least one or more of univariate metric forecasting, multivariate metric forecasting, and/or system behavior of the batch system, further explained in FIG. 3.

FIG. 3 illustrates a process flow of method for smart alerts, in accordance with an embodiment. In an embodiment, the method 300 for smart alerts can be implemented by a system, for example, the system 200 (FIG. 2).

At step 302 of method 300, performed by the alert configuration module 212 (as in FIG. 2) for the alerts generated by abnormal behavior in batch jobs. The alert configuration process 302 includes identifying the recent steady state of the batch job as shown at step 304 of method 300. In an example embodiment, the batch job undergoes various changes in a business process. Between these changes, the batch job's behavior follows one or more steady states. For the one or more steady states of the batch job, the recent steady state of the job is analyzed to provide a current behavior of the batch job. The identification of the recent steady state method includes but not limited to detection of change in mean, standard deviation and trend in job execution time. For example, the recent steady state of the batch job is analyzed by identifying the change in the metric values.

Next, the alert configuration process 302 includes deriving at least one schedule within the identified recent steady state of the batch job as shown at step 306 of method 300. In an embodiment, the schedules are derived at by:

First, one or more groups of metric values of the batch jobs are identified using Classification and Regression Trees (CARTs). The CART builds a decision tree using a recursive partitioning method. In this partitioning method, an intermediate node of the decision tree is a decision box that represents a classifier and each leaf node of the decision tree is uniquely defined by a set of rules that represents a group of similar values.

Next, the overlap between the identified groups of metric values is computed. For example, given two groups of metric values A and B, overlap may be computed using Dice's coefficient to compute the similarity between the two groups as $$\frac{2*|A \cap B|}{|A|+|B|}.$$

This overlap is computed in the range of values present in the two groups. For example, the overlap may be calculated as $$\frac{\max(A) - \min(B)}{\max(B) - \min(A)}$$

assuming that min (A)≤min (B).

Finally, a composite label may be assigned to identify groups with a significant overlap as schedules using the above criteria.

Once the schedules are derived, a normal behavior for each schedule is identified. Herein, normal behavior can be defined as a band or range of acceptable values. This range is defined using the upper and lower thresholds. The alert configuration process 302 further includes computing a normal behavior as shown at step 308 of method 300. The normal behavior is a range of acceptable values. In one of the embodiments, the range of a normal behavior is assigned by using the mean and the standard deviation of a schedule. The mean and standard deviation method includes at least 70% of data points which are in the range of $\mu \pm \sigma$ where $\mu$ is the mean and $\sigma$ is the standard deviation. In another embodiment the median and the median absolute deviation (MAD) is used to define the range of accepted values for the normal behavior. In the same embodiment, the identified schedules result in unimodal distribution within each schedule, where, range is defined by median±k*MAD. In one implementation, a skew in the distribution of metric values having range defined by median, on both sides of the median may include aggressive or conservative threshold. In another implementation, with lesser skew in the distribution, a small deviation from the expected behavior may represent an anomaly. In yet another implementation, a larger skew in the distribution of metric values may include a larger deviation to constitute an anomaly and the thresholds may be set at a larger distance.

In another embodiment, the upper and lower thresholds are determined by the amount of skewness present in the distribution of metric values and the range of acceptable range of threshold is set. For example, the range may be (−1, 1). The overall median $median_{overall}$ and MAD $MAD_{overall}$ values are identified. If the distribution exhibits skewness, the lower threshold is computed by $median_{left} - 2*MAD_{left}$ and upper threshold is computed by $median_{right} + 2*MAD_{right}$, wherein $median_{left}$ and $median_{right}$ are median values of two groups of the metric values, and $MAD_{left}$ and $MAD_{right}$ are median absolute deviation of two groups of the metric values.

The alert configuration process 302 further includes incrementally updating the model to adapt to system changes as shown at step 310 of method 300. A job that does not change its behavior frequently can be considered more stable than a job that changes sporadically. The stability may be inferred by (i) number of steady state changes and (ii) the duration of each of those steady states. In an embodiment, for every job, the right time to update is computed by identifying all the change points over its run history from the data repository 206 (as shown in FIG. 2). For example, from the past steady state durations $\{d_1, d_2, d_3, \ldots, d_n\}$, the duration of the next steady state $d_{n+1}$ is determined. As the duration $d_{n+1}$ is reached, the latest steady state is recomputed using the metric values.

At step 312 of method 300, performed by the alert aggregation module 214 (as in FIG. 2) for the alerts configured by alert configuration module 212 (as in FIG. 2). The alert aggregation process 312 includes pruning of alerts as shown at step 314 of method 300. The pruning of one or more batch jobs and alerts is based on one or more metric conditions. The examples of the metric condition may include, but not limited to, dependencies of the one or more batch jobs, execution conditions, volume of alerts generated and type of alert generated by the one or more batch jobs and so on. In an embodiment, for each job-alert J, pruning strategies is applied to narrow down the set of job-alerts by correlating the batch jobs. For a batch job having dependencies on other batch jobs in the form of precedence relationships are used to derive the set of upstream and downstream batch jobs of the batch job J. The alerts occurring on the batch job J, may be associated with the set of upstream and downstream batch jobs and the batch jobs not present in the set are pruned. In another embodiment, every batch job in a batch job may include different execution conditions. The execution conditions of the batch job may define when a job runs. For example, an execution condition may define a batch job to run on weekdays or weekends. The batch jobs with execution conditions having low overlap with job-alert J may not produce correlated alerts with job-alert J, and hence may be pruned. In another embodiment, batch jobs may be pruned by defining a $min_{count}$ and retaining only those batch jobs that generate more alert instances than $min_{count}$. Pruning by defining a $min_{count}$ ensures sufficient confidence in the derived correlations. In yet another embodiment, a batch job generates different types of alerts, each alerts may be associated with each other. An alert type may be grouped with only some specific alert types. For example, instances of MAXRUNALARM cannot be grouped with instances of MINRUNALARM. Alerts that cannot be grouped are eliminated.

The alert aggregation process 312 further includes detecting correlations between groups of alerts as shown at step 316 of method 300. The identifying of correlated group of alerts further includes applying a plurality of correlation rules for rule chaining and grouping of alerts, wherein the grouped alerts are assigned to one or more resolvers.

The batch jobs in a batch system are time separated. The time separated batch jobs may be identified by leads and lags while identifying correlated alerts. The lead/lag factor is referred as $\Delta$. The value of $\Delta$ may be different for all pairs of batch jobs as the lead/lag value is dependent on the time difference between the executions of batch jobs. For example, the value of $\Delta$ is larger for batch jobs having a large gap between their start times than batch jobs that run one after another. In the same embodiment, the value $\Delta$ between two batch jobs A and B is computed as follows:

$$\Delta_{A,B} = t * runtime_{A,B}$$

where $runtime_{A,B}$ is the cumulative runtime between the jobs A and B and t is a multiplier to incorporate runtime variations (empirically set as 10%).

Further, $V_A, V_B$ are the alert timestamp vectors of jobs A and B respectively where A is upstream to B. The timestamps of A may occur before those of B, $\Delta$ may correspond to a lag for A and a lead for B. Furthermore, various similarity quotients are computed by similarity between two sets. For example, the similarity between two groups A and B is computed by Dice's coefficient as $$\frac{2*|A \cap B|}{|A|+|B|}.$$

The Dice's coefficient is modified by computing a term $|V_A \oplus V_B|$. The set $|V_A \oplus V_B|$ is referred to the timestamps in $V_A$ for which a unique timestamp is present in $V_B$ within the lag range $\Delta$. For example, correlations between 2 job-alerts A and B is computed using the following correlation index and retain the job-alert pairs with high correlation index:

$$Corr(A,B) = (|V_A \oplus V_B|)/(|V_A| \oplus |V_B|)$$

The job alerts may be captured in larger combination of alerts. In an embodiment, correlations between combinations of batch jobs of size 3 and more are captured. For example, combinations of the type $A_1 A_2 \ldots A_n \leftrightarrow A_{n+1}$ where the presence of two or more alerts are preconditioned for the occurrence of another. In another example, a combination of jobs $A_1 A_2 \ldots A_n$ is corresponded to the timestamps $V_1 \oplus V_2 \leftrightarrow V_n$, where $V_i$ denotes the vector of timestamps of the alert instances of the job $A_i$.

Further, a brute-force approach may be utilized to identify all combinations of size k to determine their correlation with other alerts, where, the search space becomes very large. The search space may be traversed using a modified apriori algorithm. For example, candidate sets of size k are constructed from candidate sets of size k−1. These candidate sets with combination space may pruned using one of the following approaches:

Execution conditions: Every job in a batch job is associated with an execution condition. Execution conditions of the jobs within a combination with low overlap may be excluded from that combination.

Volume: Every job-alert in combination occurs sufficient number of times. The combination of jobs $A_1 A_2 \ldots A_n$, if $|V_1 \oplus V_2 \oplus \leftrightarrow V_n| < min_{count}$ are pruned.

The alert aggregation process 312 further includes deriving causality between groups of alerts as shown at step 318 of method 300. The causality of the grouped alerts using one or more causality rules to identify potential causes and effects is derived. The groups of correlated job-alerts are identified and the causes are separated by utilizing the properties of the batch system. For each identified correlation, upstream relationships are identified. For example, the upstream side is assigned as the cause and the downstream side is assigned as the effect. In another example, the correlations are derived for combinations of job alerts $A_1 A_2 \ldots A_n \leftrightarrow A_{n+1}$, and are assigned causality direction when all jobs in $A_1 A_2 \ldots A_n$, are upstream or downstream to the job $A_{n+1}$.

Job alerts may fail to give sufficient time margins to take corrective actions. At step 320 of method 300, performed by the alert prediction module 216 (as in FIG. 2) for the prediction of alerts. The alert prediction process 320 predicts future alerts of a batch job based on at least one or more of univariate metric forecasting, multivariate metric forecasting, and system behavior. The preventive measures include the univariate forecasting for alert prediction to predict a job's behavior with respect to key metrics, for example, workload. The trend, periodicity, mean levels, seasonality and the like of a job metric are used to select the right algorithm for forecasting. For example, when a job displays varying means but no trend, a simple exponential smoothing, which is the exponentially weighted average of recent data, can be utilized. If there is a slight trend, then a regression model may be built to extrapolate for future dates. Holt's method may be used when the job displays varying trends and levels but no seasonality. The Holt's method inherently assumes a time-varying linear trend as well as a time-varying level and uses separate smoothing parameters for each. When seasonality is present along with variation in trends and levels, an ARIMA model may be used to forecast the behavior on future dates.

In another embodiment, multivariate forecasting is used to predict the values since forecasting depends on multiple metrics, for example, run time, CPU utilizations, and the like. The dependent metrics D are a function of independent metrics I: $D=f(I)$. Then I is forecasted using univariate forecasting and the values are used to predict D.

In yet another embodiment, an entire batch is analyzed to derive at a job for a time series forecast. The job derived at for time series forecast, can be derived only by analyzing the entire batch as a whole. For example, to enable a forecast, future batch scenario is simulated and the start, run, and end times of each job and business process is predicted. Further, for a given date in the future, jobs will run using the execution conditions of each job. Dependencies of the batch are identified. Independent metrics, such as, workload, and the dependent metrics, such as, runtime are estimated. Start times of the jobs are recorded for traversing the entire graph from the start point to end point of all the jobs using the predicted runtimes. Thus, the future alerts are predicted.

The system for smart alerts provides generation of optimal and up-to-date alert configurations. The system models the normal behavior of a batch job by analyzing its past history, and recommends alert configurations to report any deviation from the normal behavior as alerts. Further, the system proposes solutions to adapt to changes and eliminates redundant alerts by generating rules to detect and aggregate correlated alerts. Finally, the system generates predictive and preventive alerts.

The foregoing description of the specific implementations and embodiments will so fully reveal the general nature of the implementations and embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A processor-implemented method for generating alerts in a batch system, the method comprising:
    configuring of one or more alerts, wherein the configuring comprises:
    identifying a recent steady state of a batch job, wherein the steady state of the batch job is identified by analyzing change in a metric value associated with the steady state;
    deriving at least one schedule within the identified recent steady state of the batch job using Classification and Regression Trees (CARTS);
    computing an overlap between the identified groups of metric values, wherein the overlap indicates a similarity between the identified groups; and identifying each group of metric values with overlap as a schedule;
    computing a normal behavior within the at least one schedule, wherein the normal behavior is defined by a range of normal values within an upper threshold and a lower threshold, and wherein the upper threshold and the lower threshold is calculated by one or more of median and median absolute deviation methods;
    aggregating the one or more alerts by identifying correlated group of alerts based at least one of a historical and a real-time analysis, wherein the identifying of the correlated group of alerts comprises:
        pruning of one or more jobs and alerts based on one or more metrics conditions, wherein the one or more metric conditions comprise dependencies of one or more batch jobs, execution conditions of the one or more batch jobs, volumes of alerts generated by the one or more batch jobs and type of alert generated by the one or more batch jobs;
        detecting correlations between two or more alerts by using one or more correlation rules for grouping the alerts; and
        deriving causality of the grouped alerts using one or more causality rules to identify potential causes and effects;
    predicting of future alerts of a batch job based on at least one or more of univariate metric forecasting, multivariate metric forecasting, and system behavior.

2. The method as claimed in claim 1, wherein the configuring of the alerts are updated incrementally for next batch jobs on observing changes in the job behavior.

3. The method as claimed in claim 1, wherein the lower and upper threshold is computed based on the skewness of distribution of the metric values, wherein if the distribution exhibits skewness the lower threshold is computed by medianleft-2*MAD left and upper threshold is computed by median right+2*MAD right, wherein median left and median right are median values of two groups of the metric values, and MAD left and MAD right are median absolute deviation of two groups of the metric values.

4. The method as claimed in claim 1, wherein the identifying of correlated group of alerts further includes applying a plurality of correlation rules for rule chaining and grouping of alerts, wherein the grouped alerts are assigned to one or more resolvers.

5. The method as claimed in claim 1, wherein the one or more metrics for pruning of the one or more alerts comprises, dependencies of the one or more batch jobs, execution conditions, volume of alerts generated and type of alert generated by the one or more batch jobs.

6. A computer-implemented system for providing alerts in a batch system, the system comprising:
   at least one processor; and
   at least one memory, the at least one memory coupled to the at least one processor, wherein the at least one processor configured by said instructions for:
   configuring of one or more alerts upon triggering of an abnormal behavior in a batch job, wherein the configuring comprises:
   identifying a steady state of the batch job, wherein the steady state of the batch job identified by analyzing change in a metric value associated with the steady state;
   deriving at least one schedule within the identified steady state of the batch job by:
   identifying one or more groups of metric values of the batch job using Classification and Regression Trees (CARTs);
   computing an overlap between the identified groups of metric values, wherein the overlap indicates a similarity between the identified groups; and identifying each group of metric values with overlap as a schedule;
   computing a normal behavior within the at least one schedule, wherein the normal behavior is defined by a range of normal values within an upper threshold and a lower threshold, and wherein the upper threshold and the lower threshold is calculated by one or more of median and median absolute deviation methods; and
   aggregating the one or more alerts by identifying a correlated group of alerts based on at least one of a historical and a real-time analysis, wherein the identifying of the correlated group of alerts comprises:
   pruning of one or more jobs and alerts based on one or more metrics conditions;
   detecting correlations between two or more alerts by using one or more correlation rules for grouping the alerts; and
   deriving causality of the grouped alerts using one or more causality rules to identify potential causes and effects;
   predict future alerts of a batch job based on at least one or more of univariate metric forecasting, multivariate metric forecasting, and system behavior.

7. The system as claimed in claim 6, wherein the lower and upper threshold is computed based on the skewness of distribution of the metric values, wherein if the distribution exhibits skewness the lower threshold is computed by medianleft-2*MADleft and upper threshold is computed by medianright+2*MADright, wherein medianleft and medianright are median values of two groups of the metric values, and MADleft and MADright are median absolute deviation of two groups of the metric values.

8. The system as claimed in claim 6, wherein the identifying of correlated group of alerts further includes applying a plurality of correlation rules for rule chaining and grouping of alerts, wherein the grouped alerts are assigned to one or more resolvers.

9. The system as claimed in claim 6, wherein the one or more metrics for pruning of the one or more alerts comprises, dependencies of the one or more batch jobs, execution conditions, volume of alerts generated and type of alert generated by the one or more batch jobs.

10. A non-transitory computer-readable medium having embodied thereon a computer program for executing a method for providing alerts, the method comprising:
    configuring of one or more alerts upon triggering of an abnormal behavior in a batch job, wherein the configuring comprises:
    identifying a steady state of the batch job;
    deriving at least one schedule within the identified steady state of the batch job by:
    identifying one or more groups of metric values of the batch job using Classification and Regression Trees (CARTs);
    computing an overlap between the identified groups of metric values, wherein the overlap indicates a similarity between the identified groups; and identifying each group of metric values with overlap as a schedule;
    computing a normal behavior within the at least one schedule, wherein the normal behavior is defined by a range of normal values for an upper threshold and a lower threshold, and wherein the upper threshold and the lower threshold is calculated by one or more of median and median absolute deviation methods;
    aggregating the one or more alerts by identifying correlated group of alerts based at least one of a historical and a real-time analysis, wherein the identifying of the correlated group of alerts comprises:
    pruning of one or more jobs and alerts based on one or more metrics conditions;
    detecting correlations between two or more alerts by using one or more correlation rules for grouping the alerts; and
    deriving causality of the grouped alerts using one or more causality rules to identify potential causes and effects;
    predicting of future alerts of a batch job based on at least one or more of univariate metric forecasting, multivariate metric forecasting, and system behavior.

* * * * *